US00RE44337E

(19) United States
(12) Reissued Patent
Greenway et al.

(10) Patent Number: US RE44,337 E
(45) Date of Reissued Patent: Jul. 2, 2013

(54) COMBINATION WATER DISPENSER WITH HEATING MECHANISM

(75) Inventors: Douglas G. Greenway, Guelph (CA); Shawn C. Nielsen, Guelph (CA); Philip E. Greenway, Guelph (CA)

(73) Assignee: Greenway Home Products Ltd., Ontario (CA)

(21) Appl. No.: 13/219,092

(22) Filed: Aug. 26, 2011

Related U.S. Patent Documents

Reissue of:
(64) Patent No.: 7,596,306
Issued: Sep. 29, 2009
Appl. No.: 11/525,959
Filed: Sep. 25, 2006

U.S. Applications:
(60) Provisional application No. 60/814,562, filed on Jun. 19, 2006.

(51) Int. Cl.
*F24H 1/20* (2006.01)

(52) U.S. Cl.
USPC ..... 392/451; 392/449; 222/146.2

(58) Field of Classification Search
USPC ..... 392/449, 451; 222/146.2
See application file for complete search history.

(56) References Cited

U.S. PATENT DOCUMENTS

| | | | |
|---|---|---|---|
| 4,871,089 | A | 10/1989 | Rader et al. |
| 4,978,833 | A | 12/1990 | Knepler |
| 5,019,690 | A | 5/1991 | Knepler |
| 5,038,752 | A | 8/1991 | Anson |
| 5,111,969 | A | 5/1992 | Knepler |
| 5,192,004 | A | 3/1993 | Burrows |
| 5,667,103 | A | 9/1997 | Donselman et al. |
| 5,678,734 | A | 10/1997 | Walker |
| 5,833,096 | A | 11/1998 | Ohu |
| 5,911,341 | A | 6/1999 | Donselman et al. |
| 6,101,835 | A | 8/2000 | Butsch et al. |
| 6,139,726 | A | 10/2000 | Greene |
| 6,182,453 | B1 | 2/2001 | Forsberg |
| 6,266,485 | B1 | 7/2001 | DeSantis et al. |
| 2002/0170921 | A1 | 11/2002 | Tan et al. |
| 2003/0183649 | A1 | 10/2003 | Tan et al. |
| 2004/0065684 | A1 | 4/2004 | Cooke et al. |
| 2004/0129723 | A1 | 7/2004 | Meder et al. |

*Primary Examiner* — Thor Campbell
(74) *Attorney, Agent, or Firm* — NSIP Law

(57) ABSTRACT

A combination water dispenser with heating mechanism including a reservoir having an automatic inlet means for replenishing water into the reservoir and a controlled water outlet means for dispensing water from the reservoir. The reservoir includes a reservoir heating element which has an applied electric current for heating the water. An indicating means for indicating the activation and deactivation of the reservoir heating element is included on the dispenser. A user actuated means adapted to simultaneously activate the reservoir heating element and the indicating means is positioned on the dispenser. A temperature regulating means responsive to the temperature of the water monitors the temperature of the water during the heating of the water. The dispenser includes an automatic deactivation means adapted to deactivate the reservoir heating element upon receiving a signal from the temperature regulating means.

32 Claims, 12 Drawing Sheets

COMBINATION WATER DISPENSER WITH HEATING MECHANISM

Matter enclosed in heavy brackets [ ] appears in the original patent but forms no part of this reissue specification; matter printed in italics indicates the additions made by reissue.

*This application claims the benefit under 35 U.S.C. §119 (e) of U.S. Provisional Application No. 60/814,562 filed on Jun. 19, 2006.*

FIELD OF THE INVENTION

This invention relates in general to automated water dispensers having both single and multiple tanks for the dispensing of hot and room temperature water. This invention also relates to an energy efficient method, delivering far superior energy efficiency as compared to conventional continuous operation hot water tank systems. The invention described below provides for a consumer activated hot water on demand system, providing superior temperature, performance and reliability to traditional heating systems employed within water dispensers.

BACKGROUND OF THE INVENTION

There are various types of water dispensers disclosed in the prior art, however many of these dispensers are complex in design and costly in manufacturing. Specifically many of these dispensers address the ability to have a reservoir of water that dispenses hot water on command, as opposed to our invention which provides hot water on demand. Many of these dispensers maintain the water at a constant pre-determined temperature by having a sensor set to the pre-determined temperature which engages a heating unit when the temperature drops below the pre-determined temperature.

Conventional heating systems are utilized in all water dispensing applications that are currently available in the retail market. Conventional heating systems utilize a variety of approaches, including immersion style and banded heating elements, which are all based on resistance style heating mechanisms. Temperature is controlled either electronically or through the use of mechanical thermostats, and regulates the temperature of the water between a low and upper setpoint as defined by the control mechanism utilized. These heating systems operate *at all times, e.g.,* 24 hours a day, 7 days a week, continuously, retaining the fluid within the hot tank system within the pre-determined control levels. Continuous operation of heating systems is known to be very inefficient with respect to energy consumption, and leads to significant performance issues, reducing component longevity.

Prior art combination water dispensers have been devised to address these issues. For example, U.S. Pat. No. 5,019,690 issued on May 28, 1991 to Knepler discloses a boiling water, dispenser includes a hot water reservoir, a user-actuated faucet for drawing boiling water from a discharge zone at the top of the reservoir, and a solenoid-actuated valve for admitting unheated water to an inlet zone at the bottom of the reservoir. An electric resistance heating element within the reservoir is supplied with AC current through a series-connected bilateral switch device which is periodically switched on and off in response to the sensing of steam in a reservoir venting conduit to maintain the dispensing temperature at the boiling point.

U.S. Pat. No. 5,038,752 issued to Anson on Aug. 13, 1991 discloses a sensor assembly for a boiling water dispenser that includes clamping members for mounting a sensor such as a thermister in position to sense the presence and absence of steam. The activation of this sensor is based upon steam generation, which requires water temperatures in excess of 100° C. (212° F.).

U.S. Pat. No. 4,871,089 issued to Rader et al. on Oct. 3, 1989 and relates to a hot water dispenser is provided for dispensing a selected volume of water at a predetermined water temperature. The dispenser has a body defining a predetermined sized cavity having an inlet for receiving cold water and an outlet for dispensing hot water. A heating mechanism is disposed within the body for heating the water contained within the cavity. A manually operable timer switch is operated to energize the heating mechanism and to select a time period for maintaining the heating mechanism energized. This selected time period determines the selected volume of heated water dispensed. A thermally responsive mechanism enables dispensing water from the outlet responsive to the predetermined water temperature of the heated water.

Knepler is the owner of U.S. Pat. No. 4,978,833 which issued on Dec. 18, 1990 and discloses a hot water dispenser includes a hot water reservoir, a user-actuated faucet for drawing hot water from an outlet zone near the top of the reservoir, and a solenoid-actuated valve for admitting unheated water to an inlet zone at the bottom of the reservoir. An inline flow regulator establishes an inlet flow rate less than the faucet flow rate to maximize the volume of hot water available at the faucet. An electric resistance heating element within the reservoir is supplied with AC current through a series-connected bilateral switch device which is periodically switched on and off in accordance with the temperature of water sensed by a sensor at the faucet to maintain a constant dispensing temperature. The switch device is thermally coupled to the bottom of the reservoir such that the reservoir acts as a heat sink to dissipate heat generated during switching. An indicator lamp conditioned by the sensor confirms to the user that the dispensing temperature is within a predetermined range.

Forsberg is the owner of U.S. Pat. No. 6,182,453 which issued on Feb. 6, 2001, and describes a portable water generating system for production of high-purity liquid water by condensation of dew from ambient air. Forsberg describes a heated, food type, stainless steel tank with an insulating jacket, being in fluid communication with the heated fluid delivery control valve and the ambient temperature water in the storage tank. Water at a temperature of up to about 75° C. (167° F.) can be delivered from the heated fluid delivery control valve. Forsberg additionally describes an alternate method of supplying heated water through a resistance heated tube of sufficient length to heat water being delivered from the ambient temperature zone of the reservoir to the hot water external valve.

Thus a water dispenser having a superior energy efficient, -user activated hot water on demand mechanism, with a single dispensing mechanism for both room temperature water and hot water where the hot water is generated by a user activated on demand heating mechanism is desirable.

SUMMARY OF THE INVENTION

An object of one aspect of the present invention is to provide an improved combination water dispenser with a user activated on-demand heating mechanism.

In accordance with one aspect of the present invention there is provided a combination water dispenser with a user activated on-demand heating mechanism including a reservoir having an automatic inlet means for replenishing water into the reservoir and a controlled water outlet means for dispensing water from the reservoir. The reservoir includes a reservoir heating element which has an applied electric current for heating the water. The heating element used on the reservoir may be either an immersion or external surface (banded or base mounted) element. A visible and/or audible indicating means for indicating the activation and deactivation of the reservoir heating element is included on the dispenser. A user actuated means adapted to simultaneously activate the reservoir heating element and the indicating means is positioned on the dispenser. A temperature regulating means responsive to the temperature of the water monitors the temperature of the water during the heating of the water. Finally the dispenser includes an automatic deactivation means adapted to deactivate the reservoir heating element upon receiving a signal from the temperature regulating means.

Conveniently, the dispenser is freestanding and/or convertible to a countertop application and can dispense either heated hot water or room temperature water. Both the hot and room temperature waters can be dispensed from the same tap, therefore not requiring two taps on the dispenser. Preferably the water automatically refills the reservoir via a gravity fed bottle system and or pressurized point-of-use system so the reservoir always has water either at room temperature or hot water via the activation of the heating element.

The user activated means of the reservoir heating element allows for the user to activate the heating of the water when desired rather than having hot water provided through a continuously active heating system that operates *at all times* (*e.g.*, "24/7"). The dispenser may also include a second reservoir that can dispense cold water via a means of refrigeration.

Advantages of the present invention are: the user activation of the heating element allows for the user to control when the hot water is required rather than having hot water on demand, reduced energy costs as the water is not being constantly heated to maintain the temperature of the hot water, reducing manufacturing costs as the heating element and construction of the dispenser can be simplified, reduced maintenance costs as the heating elements are not being constantly used so that there is wear resulting in breakdown of the heating element, the dispenser may also include a cold water reservoir that can provide cold water as well, the construction of the dispenser only requires a single reservoir for both hot and room temperature water therefore allowing for a compact design and only requires one tap to dispense both types of water.

BRIEF DESCRIPTION OF THE DRAWINGS

A detailed description of the preferred embodiments is provided herein below by way of example only and with reference to the following drawings, in which.

Figure 1:
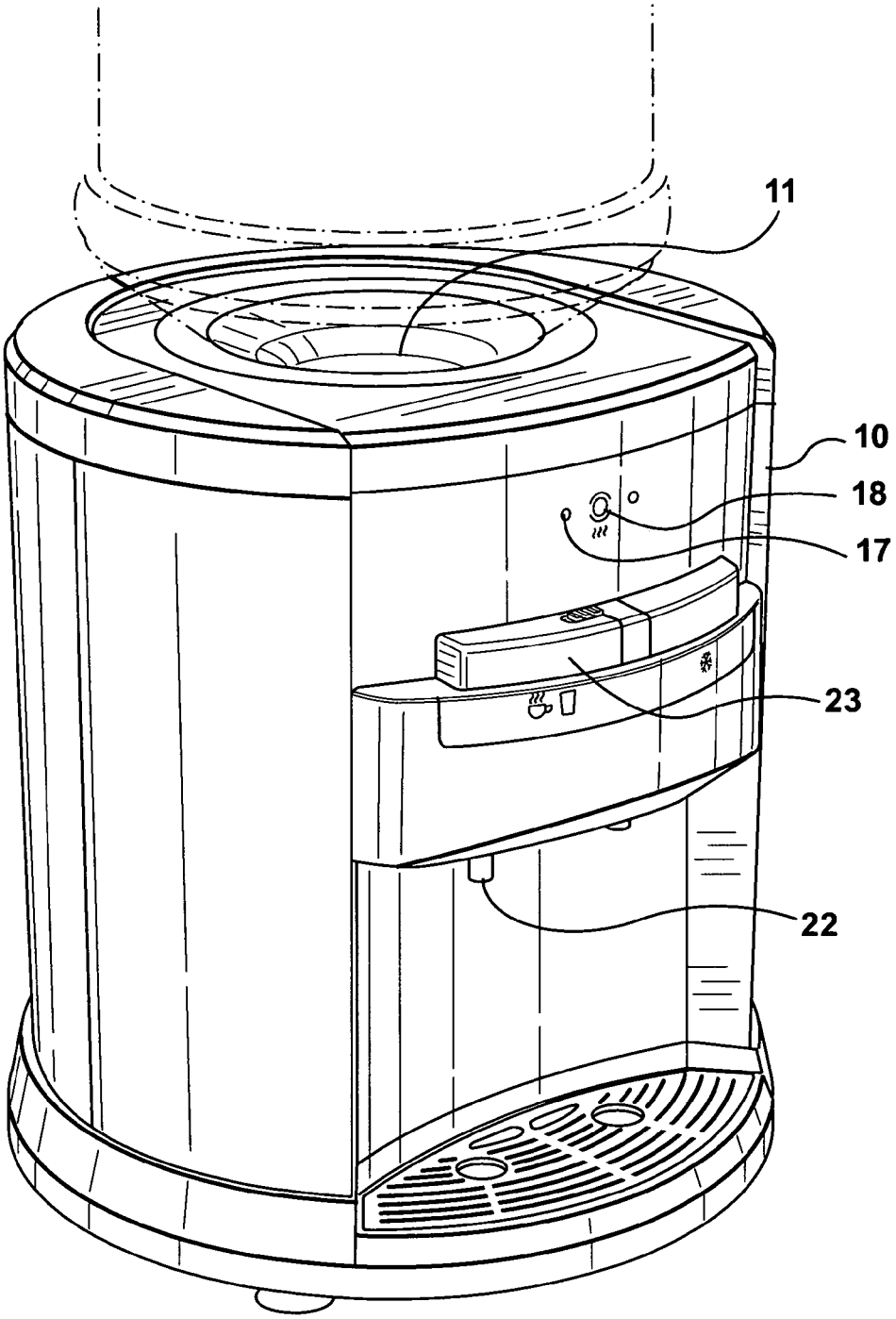
FIG. 1 is a perspective view, illustrates a combination water dispenser with heating mechanism in accordance with a preferred embodiment of the present invention.
Figure 1A:
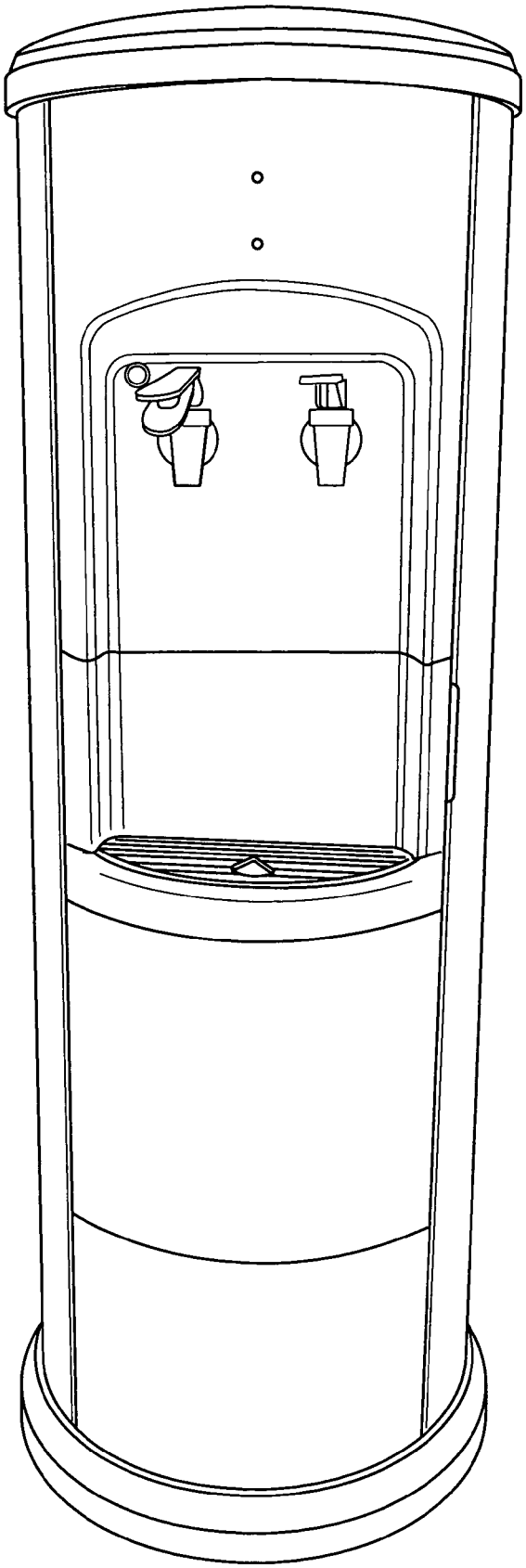
Figure 1B:
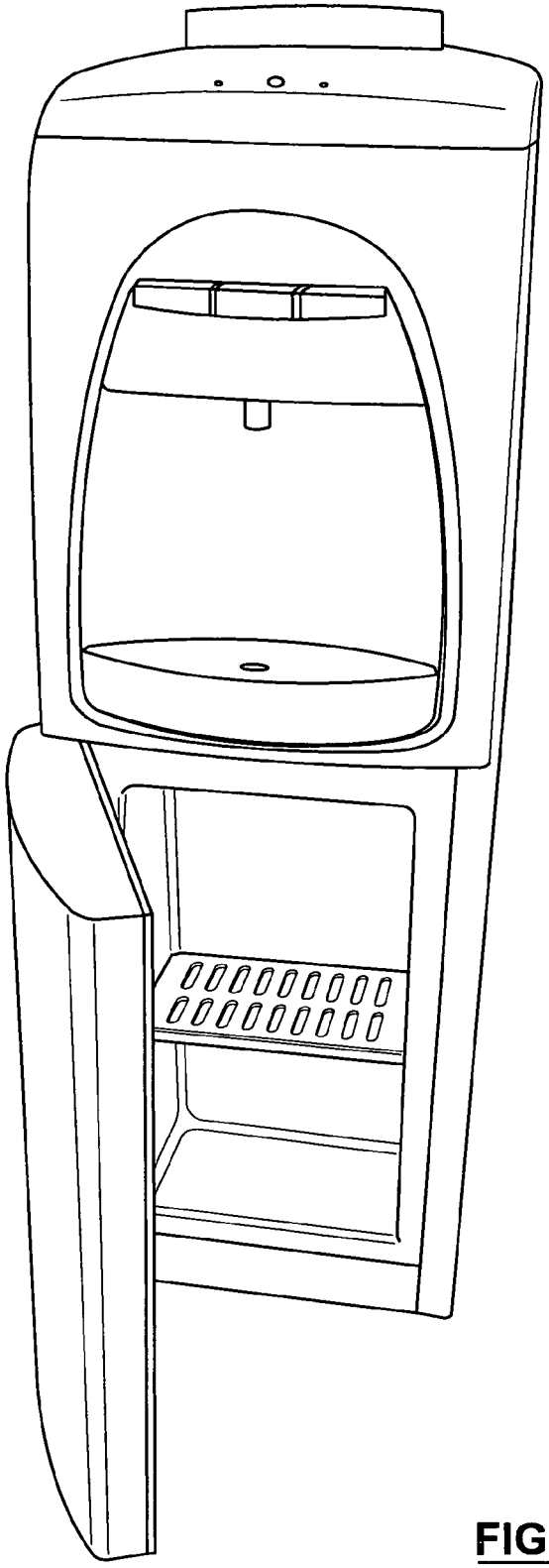
Figure 1C:
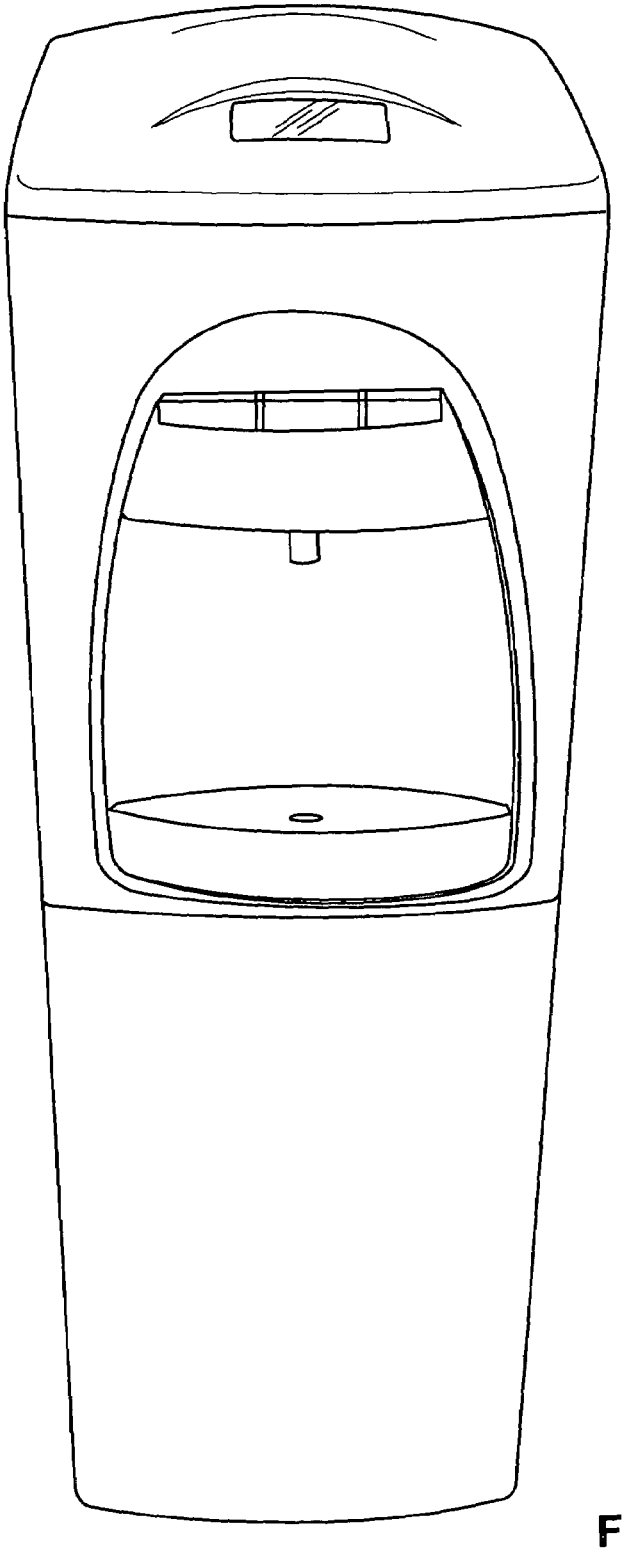

In the drawings, preferred embodiments of the invention are illustrated by way of example. It is to be expressly understood that the description and drawings are only for the purpose of illustration and as an aid to understanding, and are not intended as a definition of the limits of the invention.

DETAILED DESCRIPTION OF THE PREFERRED EMBODIMENT

Figure 2:
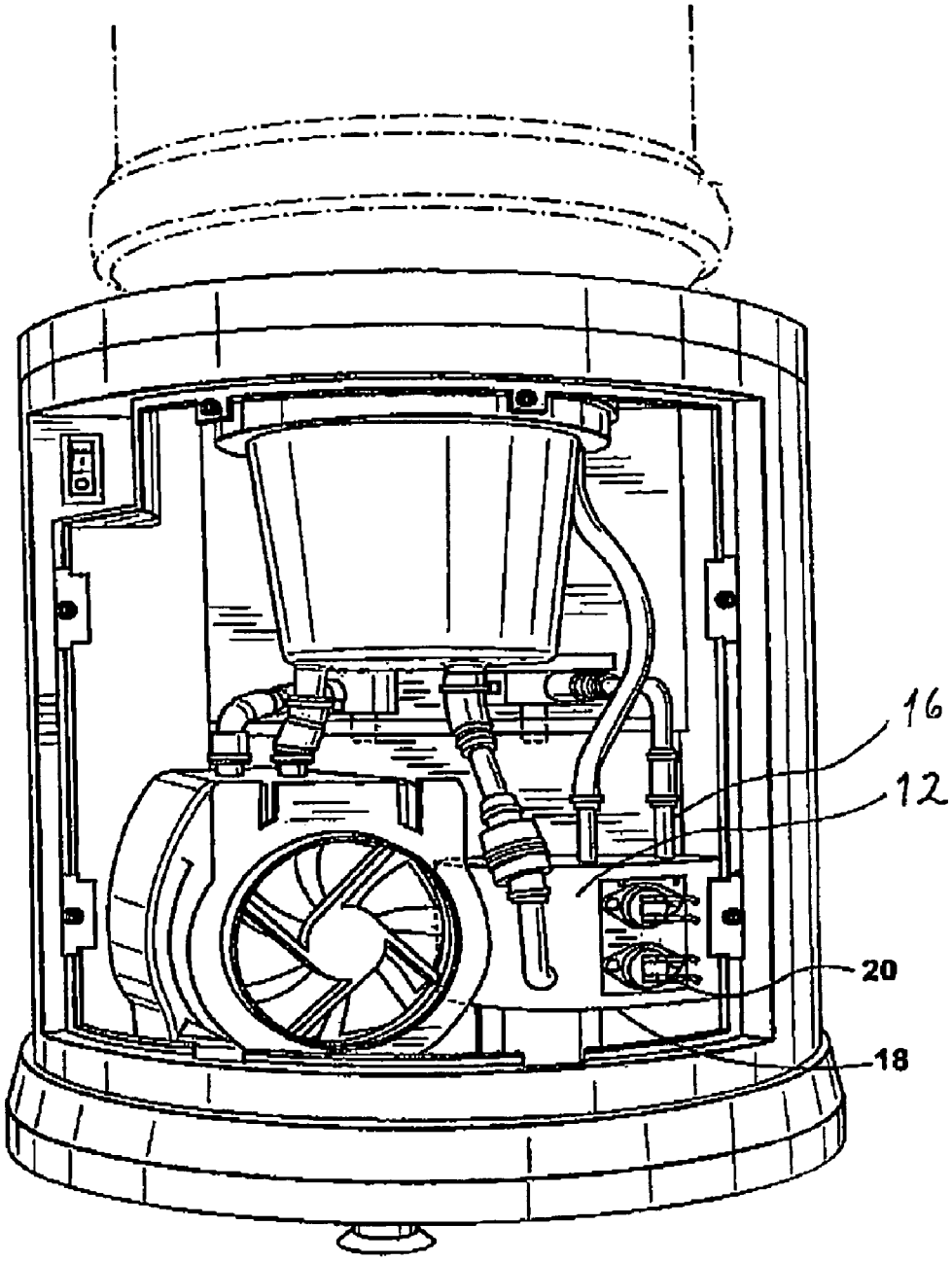
FIG. 2 is a perspective view, illustrates the dispenser of FIG. 1.
Figure 2A:
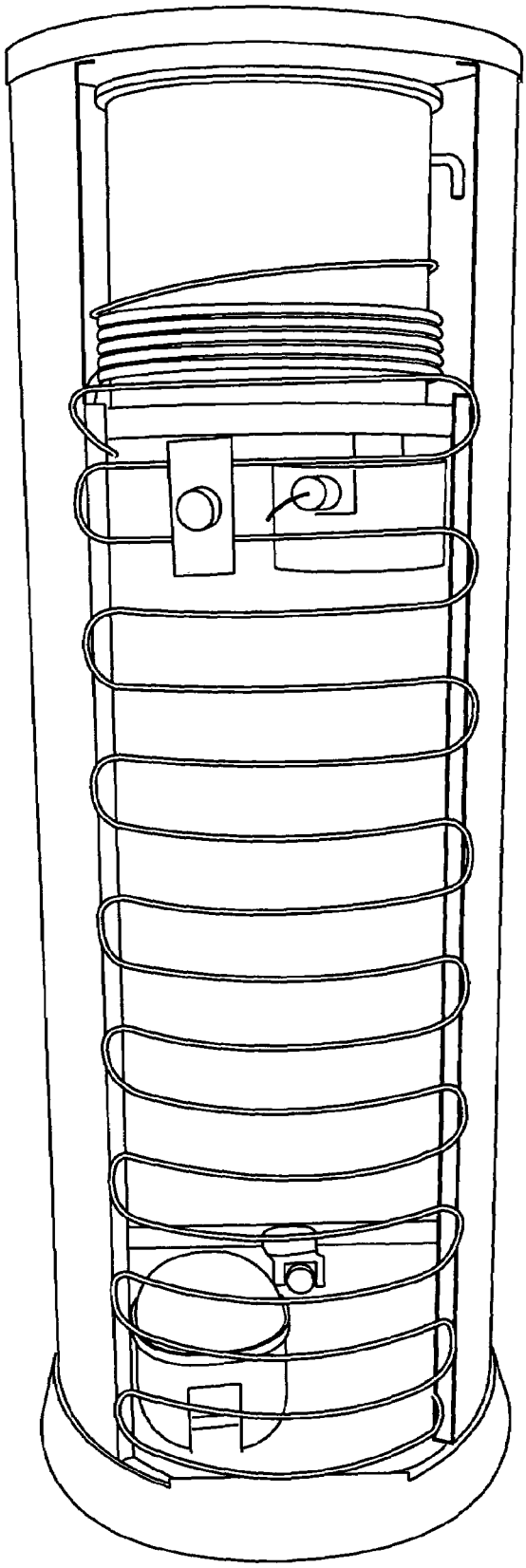
Figure 2B:
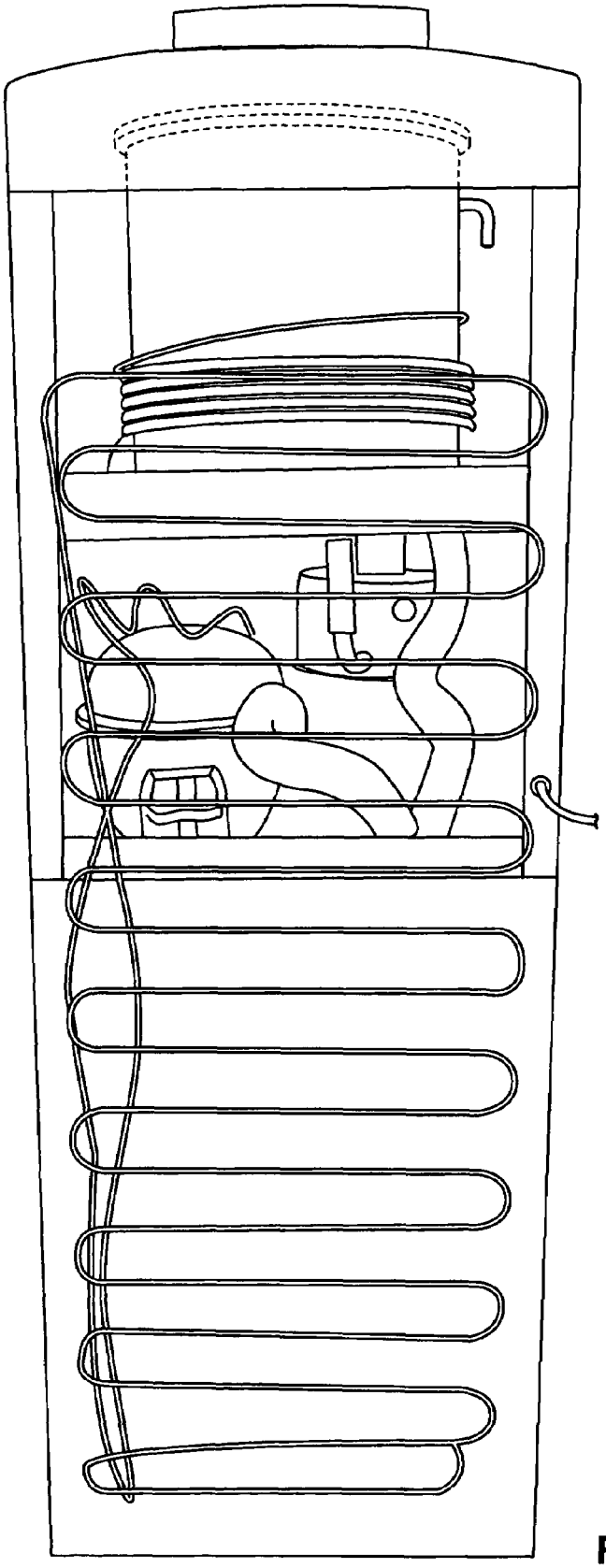
Figure 2C:
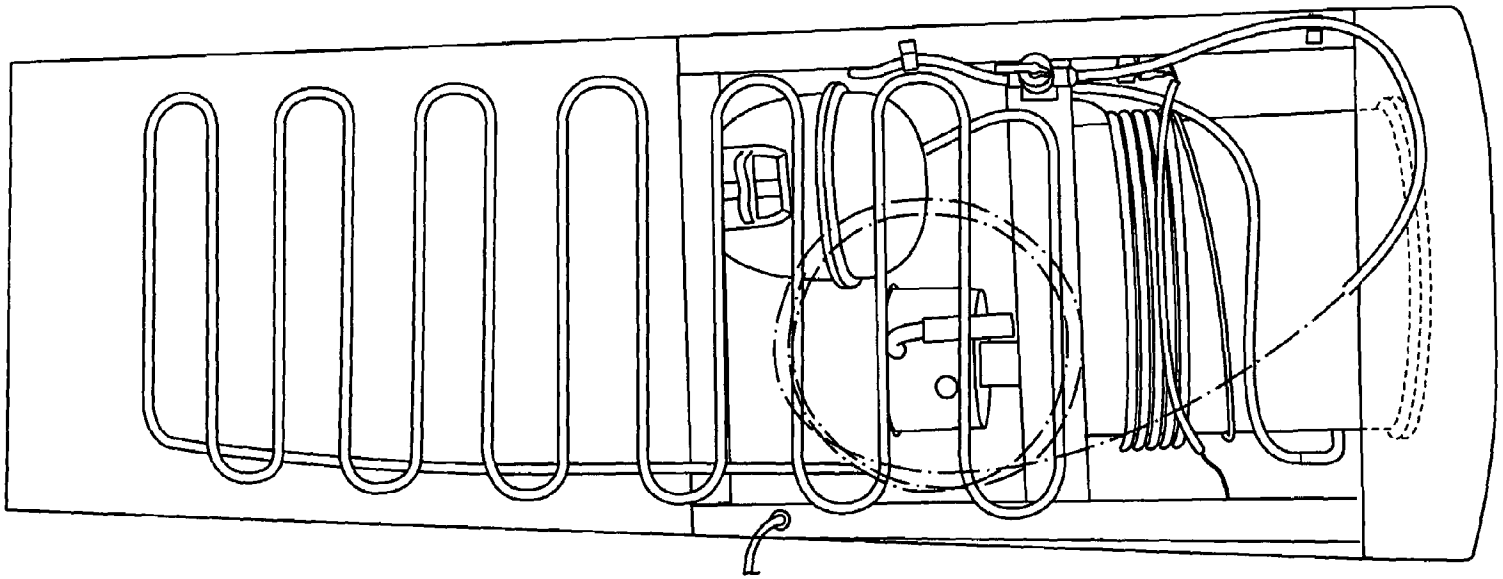
Figure 3:
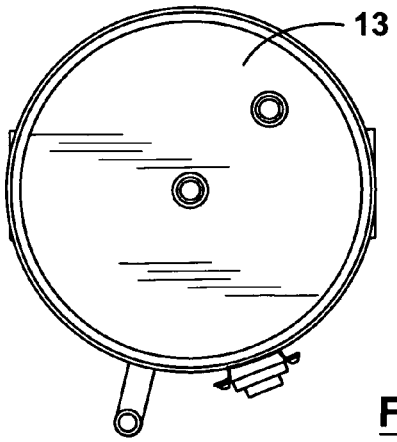
FIG. 3 is a top plan view.
Figure 3A:
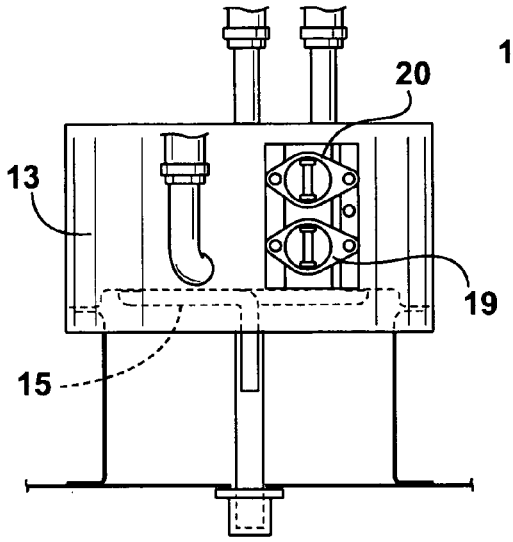
FIG. 3A is a side plan view.
Figure 3B:
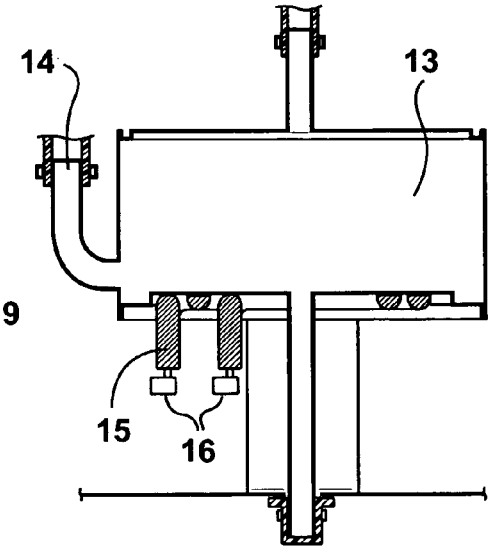
FIG. 3B is a cross-sectional view.
Figure 3C:
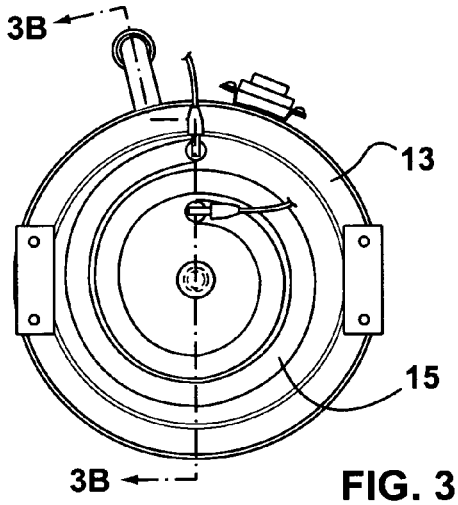
FIG. 3C is a base plan view of a preferred embodiment illustrating the hot/room tank reservoir of FIG. 1.
Figure 4:
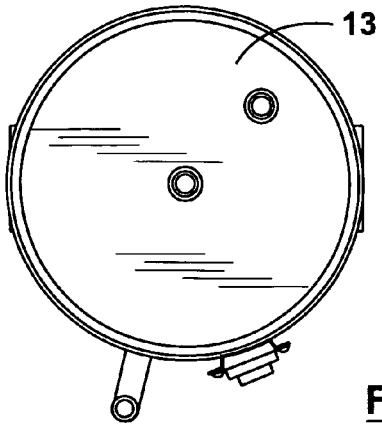
FIG. 4A is a side plan view.
FIG. 4B is a cross-sectional view and FIG. 4C is a base plan view of a preferred embodiment illustrating the hot/room tank reservoir of FIG. 1.
Figure 4A:
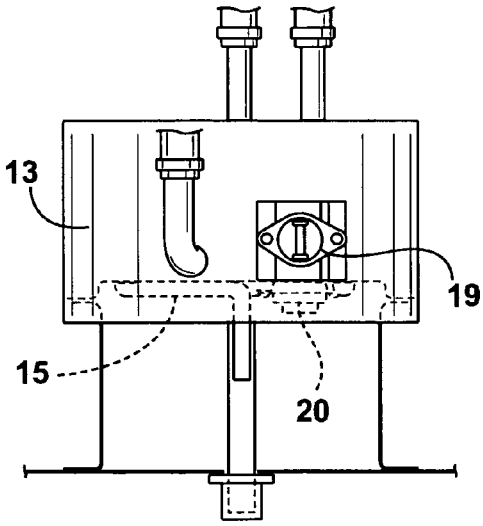
Figure 4B:
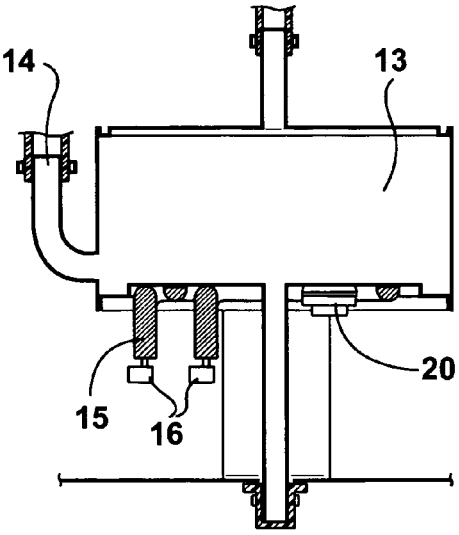
Figure 4C:
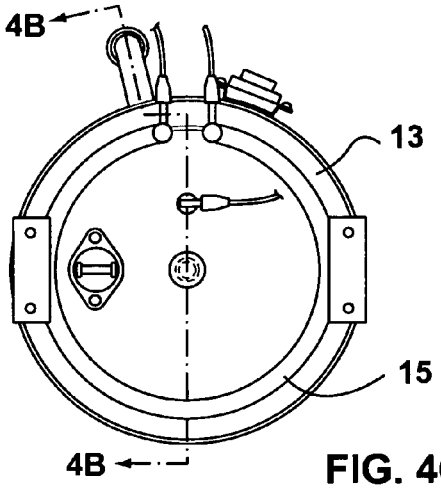
Figure 5:
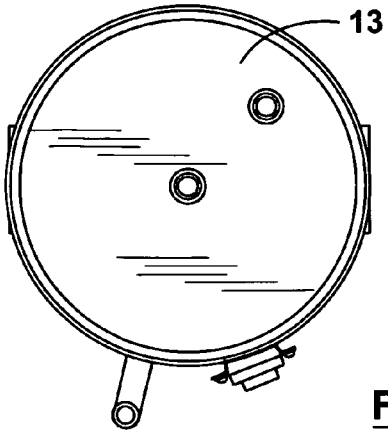
FIG. 5A is a side plan view.
FIG. 5B is a cross-sectional view.
FIG. 5C is a base plan view of a preferred embodiment illustrating the hot/room tank reservoir of FIG. 1.
Figure 5A:
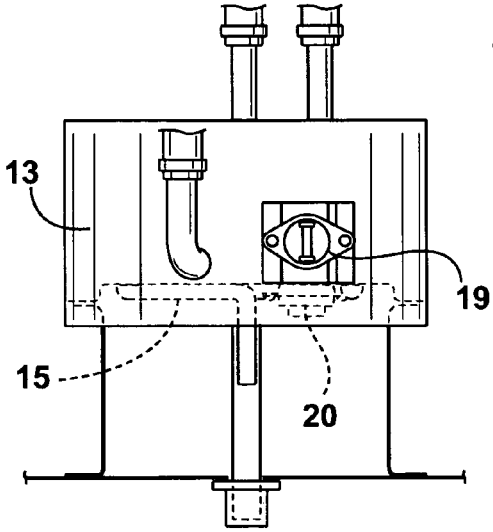
Figure 5B:
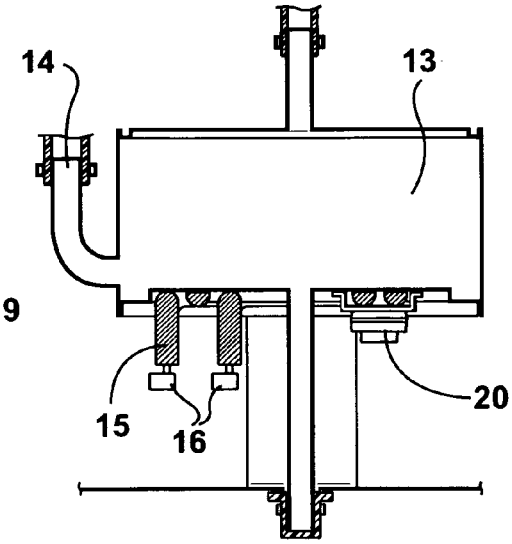
Figure 5C:
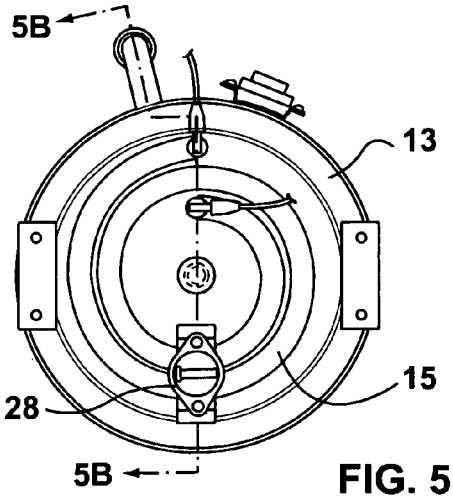
Figure 6:
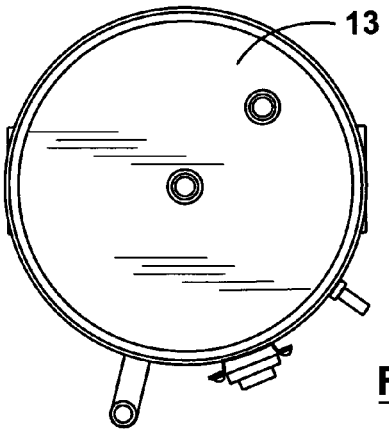
FIG. 6A is a side plan view.
FIG. 6B is a cross-sectional view.
FIG. 6C is a base plan view of a preferred embodiment illustrating the hot/room tank reservoir of FIG. 1.
Figure 6A:
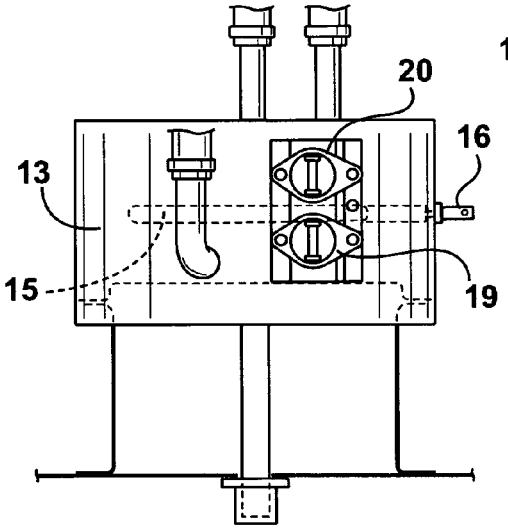
Figure 6B:
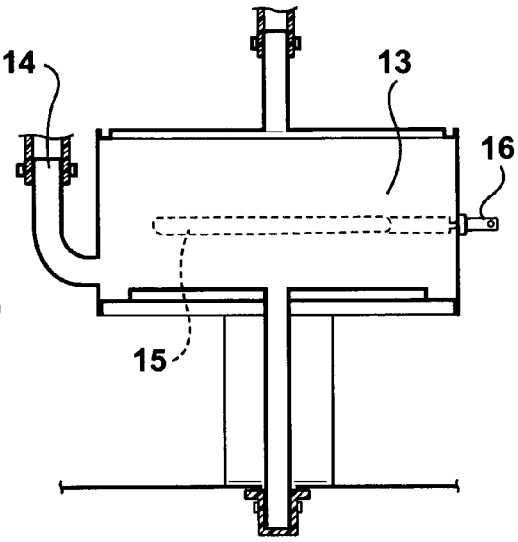
Figure 6C:
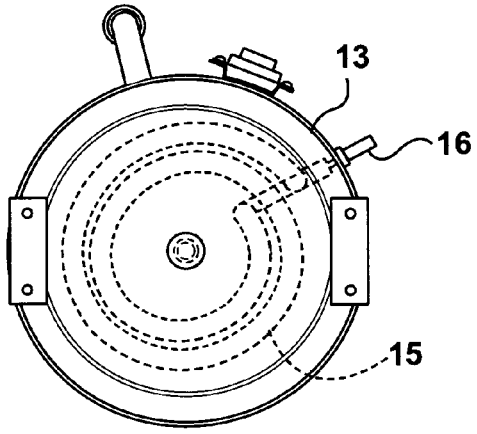

Referring to FIGS. 1-6, there is illustrated in a perspective view, a combination water dispenser with user activated on-demand heating mechanism in accordance with the preferred embodiments of the present invention. The combination water dispenser with heating mechanism 10 includes a reservoir 12 having an automatic inlet means 11 for replenishing water into the reservoir 12. The combination water dispenser has an on demand heating system reservoir 13, with a water inlet line 14 connected to the unit reservoir 12. The combination water dispenser also has a controlled water outlet means 22 for dispensing water from the on demand heating system reservoir 13. The on demand heating system reservoir 13 includes an on demand reservoir heating element 15 which has an applied electric current 16 for heating the water.

The dispenser 10 further includes an indicating means 17 for indicating the activation and deactivation of the reservoir heating element 15. A user activated means 18 is adapted to simultaneously activate the reservoir heating element 15 and the indicating means 17. The dispenser 10 further includes a temperature regulating means 19 that is responsive to the temperature of the water and monitors the temperature of the water during the heating of the water. Finally the dispenser 10 includes a safety mechanism for automatic deactivation means 20 adapted to deactivate the reservoir heating element 15 which will activate upon any failures with the primary temperature regulating thermostat 19.

More specifically the on demand heating system reservoir 13 can be utilized for both room temperature water and hot water thereby having only a single reservoir for both types of water. The on demand heating system reservoir's 13 automatic inlet means 14 may be further defined as a gravity flow feed system 21 that utilizes gravity to replenish the water level in the on demand heating system reservoir 13. Conventional water jugs and/or water dispenser filtration systems may sit on top of the dispenser 11 to act as a supply of water. The controlled water outlet means 22 may be further defined as a dispensing tap 32 that can be used to both dispense both room temperature water and hot water.

The reservoir heating element 15 which has an applied electric current 16 for heating the water may be further defined as an externally mounted or immersion style conventional electric resistance heating element that is supplied with AC current when the reservoir heating element 15 is activated. The indicating means 17 for indicating the activation and deactivation of the reservoir heating element 15 may be further defined as indicator lights, or an audible indicator or a visible indicator mechanism that identifies when the reservoir heating element 15 has been activated. Specifically the indicator light 17 will be flashing during the heating cycle process, and will turn to a steady on state upon the primary thermostat 19 signaling that the hot water within the reservoir 13 has achieved the maximum optimal temperature. Furthermore, the indicator light 17 will turn off when the water temperature inside the on demand heating system reservoir 13 drops below the pre-determined safety set-point.

The user actuated means 18 for initiating the on demand heating mechanism may be further defined as a mechanism that the user can engage such as a tab or button on the outside surface of the dispenser 10 that when engaged, simultaneously activates the reservoir heating element 15, to heat up the water at the user's request, and therefore also engages the indicating means 17 as outlined above. The user therefore controls when the on demand hot water system and the activation of the reservoir heating element 15, resulting in an energy efficient heating application. The on-demand heating mechanism will only be active upon engagement of the user actuated means 18, thereby eliminating any stand by energy consumption during periods of dormancy.

The temperature regulating means 19 that is responsive to the temperature of the water and monitors the temperature of the water during the heating of the water may be further defined as [a] *one or more* temperature cycling thermistors that monitor the temperature of the water. *A thermistor is a type of resistor whose resistance varies with temperature.* Specifically the cycling thermistors [is] *are* calibrated to monitor and control the temperature of the water when it is heated. As such the *one or more* temperature cycling thermistors also [interacts] *interact* and [reflects] *reflect* the activation of the indicating means 17. More specifically, the temperature cycling thermistor 19 also works in conjunction with the user actuated means 18 to regulate the activation of the indicating means 17. *In one implementation, the temperature regulating means is a series of thermistors calibrated to monitor the pre-determined temperature of the water.* Upon the temperature cycling thermistor 19 monitoring and sensing that the water has reached the predetermined hot temperature, a signal is sent to deactivate the reservoir heating element 15 and actuate the indicating means 17 to a steady on state. The reservoir heating element 15 will automatically shut down upon completion of the user actuated heating cycle, and will remain in a dormant state indefinitely until re-activation by means of the user actuated mechanism 18.

The combination water dispenser with heating mechanism 10 may also include a second reservoir adapted to have a reservoir cooling element within the second reservoir operable from the applied electric current for cooling the water in the reservoir. In this embodiment the combination water dispenser may dispense hot or room temperature water out of a first dispensing tap and dispense cooled water from a second dispensing tap. The second reservoir may be filled from the automatic inlet means to a desired level.

Other variations and modifications of the invention are possible. All such modifications or variations are believed to be within the sphere and scope of the invention as defined by the claims appended hereto.

The invention claimed is:

1. A combination water dispenser with user activated hot water on a required basis heating mechanism consisting essentially of:

(a) a reservoir for accommodating both room temperature water and hot water having an automatic inlet means for replenishing water into the reservoir and a controlled water outlet means for dispensing both room temperature water and hot water from the reservoir;

(b) a reservoir heating element within the reservoir operable from an applied electric current for heating the water within the reservoir;

(c) an indicating means for indicating the activation and deactivation of the reservoir heating element;

(d) an user actuated means adapted to simultaneously activate the reservoir heating element and the indicating means;

(e) a temperature regulating means responsive to a predetermined temperature of the water; and (f) an automatic deactivation means adapted to deactivate the reservoir heating element upon receiving a signal from the temperature regulating means that the predetermined temperature of water has been reached until re-activation by means of the user actuated means.

2. A combination water dispenser with user activated hot water on a required basis heating mechanism as claimed in claim 1 wherein the automatic inlet means is a gravity flow feed systems or a pressurized feed systems.

3. A combination water dispenser with user activated hot water on a required basis heating mechanism as claimed in claim 2 wherein the gravity flow feed system or a pressurized feed system further includes a one way check valve that prevents backflow from the first and/or second reservoirs during operation of the combination water dispenser.

4. A combination water dispenser with user activated hot water on-demand heating mechanism as claimed in claim 1 wherein the controlled water outlet means is a single dispensing tap.

5. A combination water dispenser with user activated hot water on a required basis heating mechanism as claimed in claim 1 wherein the reservoir heating element is a conventional electric resistance heating element having an applied AC current when the user actuated means is activated.

6. A combination water dispenser with user activated hot water on a required basis heating mechanism as claimed in claim 1 wherein the indicating means is a visible indicator mechanism.

7. A combination water dispenser with user activated hot water on a required basis heating mechanism as claimed in claim 6 wherein the visible indicator mechanism is an indicator light.

8. A combination water dispenser with user activated hot water on a required basis heating mechanism as claimed in claim 1 wherein the indicating means is an audible indicator.

9. A combination water dispenser with user activated hot water on a required basis heating mechanism as claimed in claim 1 wherein the user actuated means is a manually engaged member.

10. A combination water dispenser with user activated hot water on a required basis heating mechanism as claimed in claim 9 wherein the manually engaged member is a biased button.

11. A combination water dispenser with user activated hot water on-demand heating mechanism as claimed in claim 1 wherein the temperature regulating means is a series of thermistors calibrated to monitor the pre-determined temperature of the water.

12. A combination water dispenser with user activated hot water on a required basis heating mechanism as claimed in claim 1 [wherein the] *including a* second reservoir [has] *having* a reservoir cooling element within the second reservoir operable from the applied electric current for cooling the water in the second reservoir.

13. A combination water dispenser with user activated hot water on a required basis heating mechanism as claimed in claim 12 wherein the controlled water outlet means includes a first dispensing tap for hot or room temperature water and a second dispensing tap for dispensing cooled water.

*14. A combination water dispenser with user activated hot water on a required basis heating mechanism as claimed in claim 1 including a cooling element configured to provide cooled water.*

*15. A combination water dispenser with user activated hot water on a required basis heating mechanism consisting essentially of:*

*(a) a reservoir for accommodating both room temperature water and hot water having an automatic inlet means for replenishing water into the reservoir and a controlled water outlet means for dispensing both room temperature water and hot water from the reservoir;*

*(b) a reservoir heating element within the reservoir operable from an applied electric current for heating the water within the reservoir;*

*(c) an indicating means for indicating activation and deactivation of the reservoir heating element;*

*(d) a user actuated means adapted to simultaneously activate the reservoir heating element and the indicating means;*

*(e) a temperature regulating means responsive to a predetermined temperature of the water;*

*(f) an automatic deactivation means adapted to deactivate the reservoir heating element upon receiving a signal from the temperature regulating means that the predetermined temperature of water has been reached until reactivation by means of the user actuated means; and*

*(g) a cooling means for providing cooled water.*

*16. A combination water dispenser with user activated hot water on a required basis heating mechanism as claimed in claim 15 wherein the heating reservoir heating element is only activated upon engagement of the user actuated means.*

*17. A combination water dispenser with user activated hot water on a required basis heating mechanism as claimed in claim 15 wherein the automatic inlet means comprises a gravity flow feed system or a pressurized feed system.*

*18. A combination water dispenser with user activated hot water on a required basis heating mechanism as claimed in claim 15 wherein the indicating means comprises an indicator light.*

*19. A combination water dispenser with user activated hot water on a required basis heating mechanism as claimed in claim 15 wherein the user actuated means comprises a tab or a button.*

*20. A combination water dispenser with user activated hot water on-demand heating mechanism as claimed in claim 15 wherein the temperature regulating means comprises one or more thermistors configured to monitor the temperature of the water.*

*21. A combination water dispenser with user activated hot water on a required basis heating mechanism as claimed in claim 15 wherein the controlled water outlet means includes a first dispensing tap for hot or room temperature water and a second dispensing tap for dispensing cooled water.*

*22. A combination water dispenser with user activated hot water on a required basis heating mechanism consisting essentially of:*

*(a) a reservoir for accommodating both room temperature water and hot water having an automatic inlet means for replenishing water into the reservoir and a controlled water outlet means for dispensing both room temperature water and hot water from the reservoir;*

*(b) a reservoir heating element within the reservoir operable from an applied electric current for heating the water within the reservoir;*

*(c) a user actuated means adapted to activate the reservoir heating element when hot water is desired.*

*23. A combination water dispenser with user activated hot water on a required basis heating mechanism as claimed in claim 22 wherein the heating reservoir heating element is only activated upon engagement of the user actuated means.*

*24. A combination water dispenser with user activated hot water on a required basis heating mechanism as claimed in claim 22 wherein the automatic inlet means comprises a gravity flow feed system or a pressurized feed system.*

*25. A combination water dispenser with user activated hot water on a required basis heating mechanism as claimed in claim 22 including an indicator light.*

*26. A combination water dispenser with user activated hot water on a required basis heating mechanism as claimed in claim 22 wherein the user actuated means comprises a tab or a button.*

*27. A combination water dispenser with user activated hot water on-demand heating mechanism as claimed in claim 22 including one or more thermistors configured to monitor the temperature of the water.*

*28. A combination water dispenser with user activated hot water on a required basis heating mechanism as claimed in claim 22 wherein the controlled water outlet means includes a first dispensing tap for hot or room temperature water and a second dispensing tap for dispensing cooled water.*

*29. A combination water dispenser with user activated hot water on a required basis heating mechanism as claimed in claim 22 including a housing, a frame or both.*

*30. A combination water dispenser with user activated hot water on a required basis heating mechanism as claimed in claim 22 including an electrical system configured to receive electrical power and to supply electricity to elements of the combination water dispenser.*

*31. A combination comprising:*

*a combination water dispenser with user activated hot water on a required basis heating mechanism according to claim 22; and*

*a source of water.*

*32. The combination of claim 31, wherein the source of water comprises:*

*a jug of water or a water dispenser filtration system.*

* * * * *

UNITED STATES PATENT AND TRADEMARK OFFICE

CERTIFICATE OF CORRECTION

PATENT NO. : RE44,337 E
APPLICATION NO. : 13/219092
DATED : July 2, 2013
INVENTOR(S) : Douglas D. Greenway et al.

It is certified that error appears in the above-identified patent and that said Letters Patent is hereby corrected as shown below:

On the title page, "Inventors" item (75), delete "Douglas G. Greenway" and insert --Douglas D. Greenway--.

Signed and Sealed this
Twelfth Day of November, 2013

Teresa Stanek Rea

Teresa Stanek Rea
*Deputy Director of the United States Patent and Trademark Office*